(12) United States Patent
Wang

(10) Patent No.: US 7,415,213 B2
(45) Date of Patent: Aug. 19, 2008

(54) OPTICAL RECEIVER HAVING TRANSIENT COMPENSATION

(75) Inventor: Gary Wang, Corte Madera, CA (US)

(73) Assignee: Stratalight Communications, Inc., Los Gatos, CA (US)

( * ) Notice: Subject to any disclaimer, the term of this patent is extended or adjusted under 35 U.S.C. 154(b) by 553 days.

(21) Appl. No.: 10/996,658

(22) Filed: Nov. 24, 2004

(65) Prior Publication Data

US 2006/0110170 A1 May 25, 2006

(51) Int. Cl.
*H04B 10/06* (2006.01)
(52) U.S. Cl. .......................... 398/209; 398/26; 398/27; 398/206; 398/207; 398/208; 398/210; 398/213
(58) Field of Classification Search ................. 398/26, 398/209, 206, 213
See application file for complete search history.

(56) References Cited

U.S. PATENT DOCUMENTS

| | | | | |
|---|---|---|---|---|
| 5,561,599 | A * | 10/1996 | Lu | 700/44 |
| 6,166,850 | A * | 12/2000 | Roberts et al. | 359/341.2 |
| 6,317,062 | B1 * | 11/2001 | Payer et al. | 341/56 |
| 6,963,697 | B2 * | 11/2005 | Gurusami et al. | 398/202 |
| 2003/0039328 | A1 | 2/2003 | Tomofuji et al. | |
| 2003/0202805 | A1 * | 10/2003 | Taga et al. | 398/202 |

FOREIGN PATENT DOCUMENTS

WO    WO03/013030    2/2003

OTHER PUBLICATIONS

Nakamura, M., et al., "An Instantaneous Response CMOS Optical Receiver IC with Wide Dynamic Range and Extremely High Sensitivity Using Feed-Forward Auto-Bias Adjustment", *IEEE Journal of Solid-State Circuits*, 30(9):991-997, Sep. 1995.

* cited by examiner

*Primary Examiner*—Jason Chan
*Assistant Examiner*—Danny W Leung
(74) *Attorney, Agent, or Firm*—Fish & Richardson P.C.

(57) ABSTRACT

An optical receiver having compensation for signal level transients. The receiver includes an OE converter, a transient threshold compensator, a threshold combiner and a CDR system. The OE converter receives the incoming optical signal and provides a modulated electrical signal having a high speed response for tracking the modulation on the optical signal and an averaged electrical signal having a moderate speed response for tracking changes in the average level of the optical signal. The transient threshold compensator processes the averaged electrical signal for providing a transient feedforward adjustment. The threshold combiner combines the transient feedforward adjustment with a lower speed BER feedback threshold adjustment for providing a decision threshold signal. The CDR system uses the decision threshold signal for recovering a clock, providing the BER feedback threshold adjustment, and estimating the data carried by the modulation.

8 Claims, 3 Drawing Sheets

OPTICAL RECEIVER HAVING TRANSIENT COMPENSATION

BACKGROUND OF THE INVENTION

1. Field of the Invention

The invention relates generally to optical receivers and more particularly to an optical receiver having signal level transient compensation.

2. Description of the Background Art

Optical transmission systems include a transmitter for transmitting a modulated optical signal into a link and a receiver for receiving the signal from the link. The link may span a short distance or thousands of kilometers. Existing optical receivers have an optical to electrical (OE) converter, typically using a photodiode, for converting the incoming optical signal to an electrical signal. The electrical signal drives a clock data recovery (CDR) system that recovers the clock and then uses the clock for sampling the electrical signal. The modulated data is recovered by comparing the sampled signal to a fixed decision threshold level. A sampled signal level that is above the threshold level yields a bit sense of one and a level below the threshold level yields a bit sense of zero.

When the decision threshold level is fixed, any variation or transient in average power of the incoming signal can lead to bit errors. Some workers have attempted to resolve this problem by leveling the variations and transients with optical devices in the link. This has been done with variable gain erbium-doped fiber amplifiers (EDFA)s and variable optical attenuators (VOA)s. However, these optical devices can be expensive for new systems and the installation cost for retrofitting into existing systems can be prohibitive.

There is a need for an inexpensive way to minimize bit errors when variations and transients occur in optical signal power.

SUMMARY OF THE INVENTION

Briefly, the present invention is an optical receiver having an electrical method for improving tolerance for the variations and transients on an incoming modulated optical signal. The receiver includes an optical to electrical (OE) converter, a transient threshold compensator, a threshold combiner and a clock data recover (CDR) system. The OE converter receives the incoming optical signal and provides a modulated electrical signal having a high speed response for tracking the modulation on the optical signal and an averaged electrical signal having a moderate speed response for tracking changes in the average level of the optical is signal. The transient threshold compensator processes the averaged electrical signal for providing a transient feedforward adjustment. The threshold combiner combines the transient feedforward adjustment with a low speed BER-based feedback adjustment for providing a decision threshold signal. The CDR system uses the decision threshold signal for recovering a clock, providing the BER-based feedback adjustment, and estimating the data carried by the modulation.

The optical receiver of the present invention has the benefit of using low cost electrical circuitry contained within the receiver for improving bit error rate (BER) performance for an optical signal when the optical signal level has transients and/or variations.

This and other benefits of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
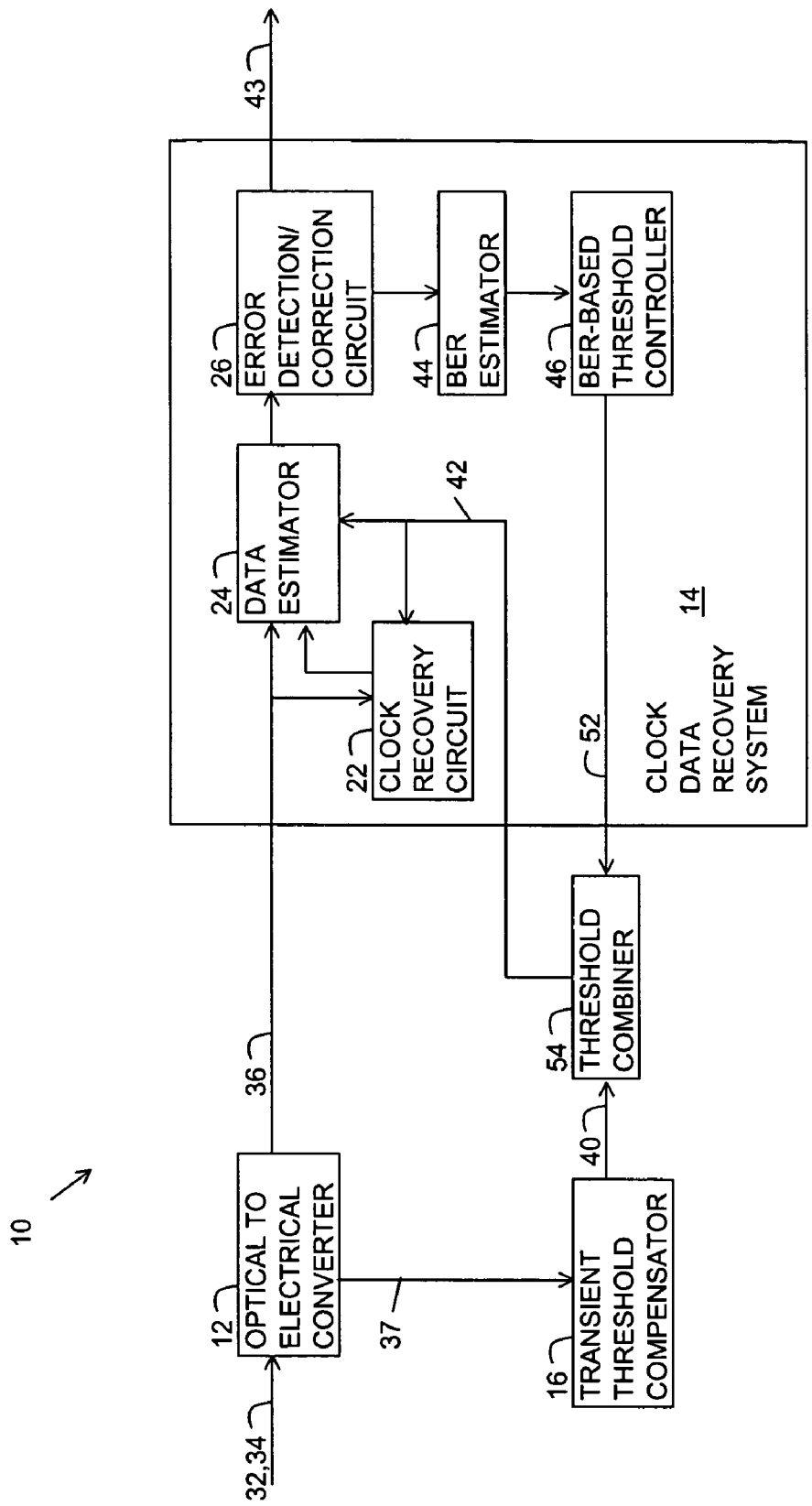
FIG. 1 is a block diagram of an optical receiver of the present invention.

FIG. 1 is a block diagram of a receiver of the present invention referred to with a reference number 10. The receiver 10 includes an optical to electrical (OE) converter 12, a clock and data recovery (CDR) system 14 and a transient threshold compensator 16. The CDR system 14 includes a clock recovery circuit 22, a data estimator 24, and an error detection/correction circuit 26. It should be noted that a "circuit" typically includes both hardware and software. The receiver 10 may also include other components such as optical and electrical demultiplexers, amplifiers and filters.

The OE converter 12 couples to an optical link 32 for receiving an incoming amplitude or intensity modulated optical signal 34 and converting the signal 34 to a modulated electrical signal 36. The modulated electrical signal 36 may be baseband where the modulation is the signal 36, or the modulation may be carried on an intermediate frequency carrier signal. In either case, the pattern and rate of the modulation on the electrical signal 36 is representative of the pattern and rate of the modulation on the optical signal 36.

The OE converter 12 also converts the optical signal 34 into an electrical signal 37 having a level proportional to the average of the optical signal 34 and passes the averaged signal 37 to the transient threshold compensator 16. The averaged electrical signal 37 has a response time fast enough to follow transients in the optical signal 34 but not fast enough to track the modulation. The frequency response of the averaged electrical signal 37 may be about one-tenth to about one one-thousandth the frequency response of the signal 36. The transient threshold compensator 16 uses the averaged electrical signal 37 for providing a dynamic transient feedforward adjustment 40.

One or more photodetectors may be used by the OE converter 12 for providing both the modulated electrical signal 36 and the averaged electrical signal 37. The signal for the average of the level of the optical signal 34 can be the average current in a photodiode. Alternatively, the transient threshold compensator 16 filters the electrical signal 36 for providing the averaged electrical signal 37.

The OE converter 12 passes the electrical signal 36 to the clock recovery circuit 22 and the data estimator 24 in the CDR system 14. The clock recovery circuit 22 uses the level of a decision threshold signal 42 for synchronizing a clock to the modulation on the electrical signal 36 and passes the clock to the data estimator 26.

The data estimator 24 uses the clock for sampling the electrical signal 36 and compares the samples to the level of the decision threshold signal 42 for providing estimated data having a sense or level of 1 (one) when the sampled signal is greater than the decision threshold signal 42 and a sense or level of 0 (zero) when the sampled signal is less than the decision threshold signal 42. The senses of 1 and 0 are used for data words having single bit data estimation. It should be noted that multiple bits may be used for the estimated data. For example, for two bit data a word of "11" might indicate a high level one, a word of "10" might indicate a lower level one, a word of "01" a high level zero and a word "00" might indicate a lower level zero. The same idea can be extended to words having many bits.

The data estimator 24 passes the ones and zeroes as estimated data to the error detection/correction circuit 26. The error detection/correction circuit 26 uses the estimated data for detecting and correcting errors in the estimated data and then issues corrected estimated data as an output data signal 43.

The CDR system 14 optionally includes a BER estimator 44 and a BER-based threshold controller 46. The BER estimator 44 estimates a bit error rate based on error detection information from the error detection/correction circuit 26. The BER-based threshold controller 46 uses the estimated bit error rate for providing a BER feedback threshold adjustment 52 to a threshold combiner 54. The threshold combiner 54 combines the BER feedback threshold adjustment 52 with transient feedforward adjustment 40 received from the transient threshold compensator 16 for providing the decision threshold signal 42. It should be noted that the response time of the transient feedforward adjustment 40 may be about ten to a thousand or more times faster than the response time of the BER feedback threshold adjustment 52.

The electrical signals 36 and 37, transient feedforward adjustment 40, the decision threshold signal 42 and the BER feedback transient adjustment 52 are multi-level signals (more than two levels) when the incoming optical signal 34 is a multi-level signal.

Figure 2A:
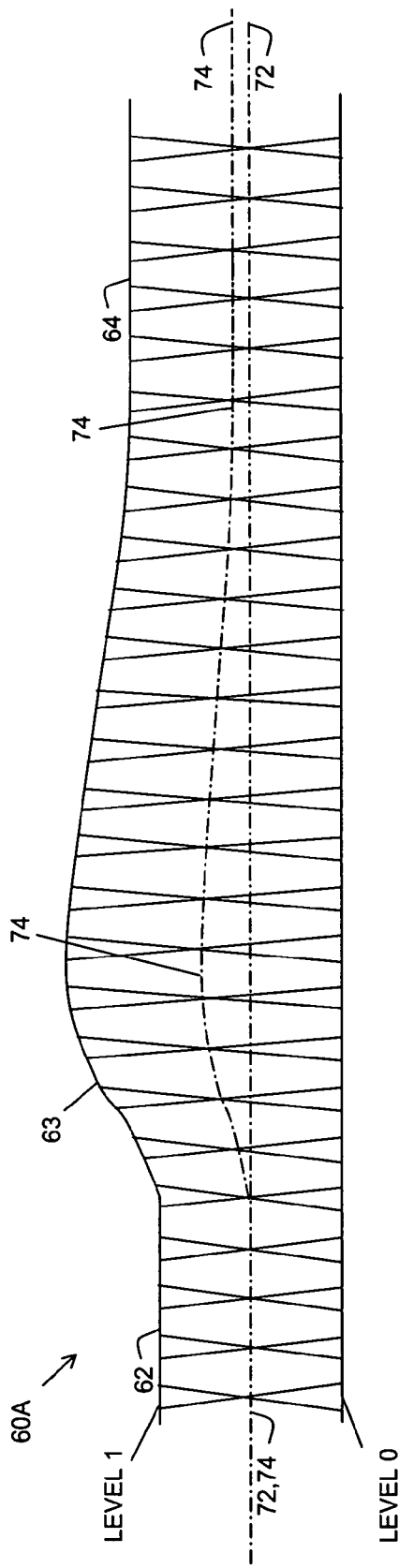
FIG. 2A is a time chart showing a decision threshold signal for the receiver of FIG. 1 for an incoming optical signal having a positive transient.
Figure 2B:
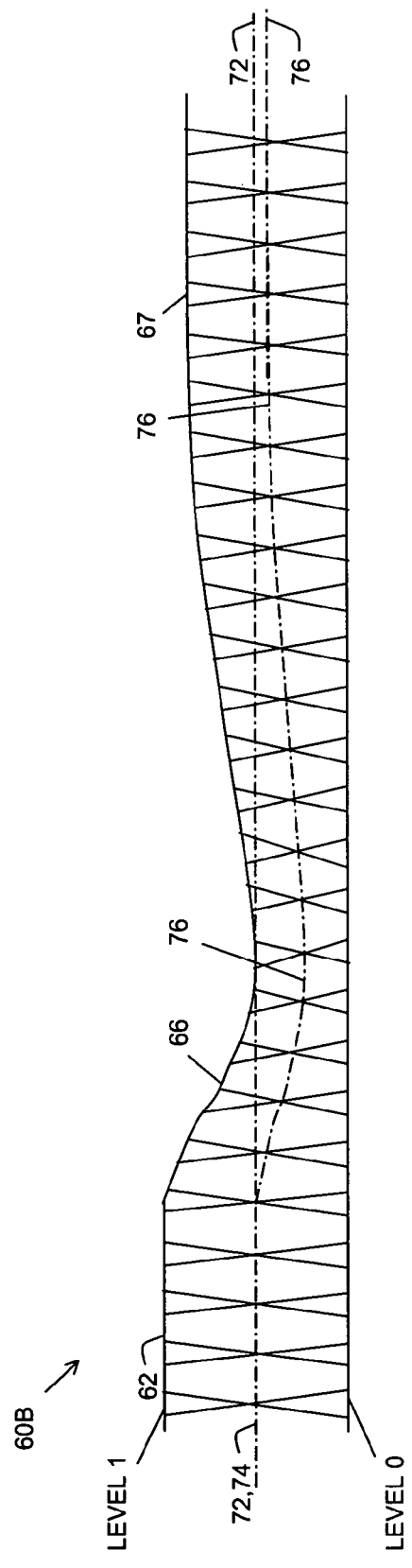
FIG. 2B is a time chart showing a decision threshold signal for the receiver of FIG. 1 for an incoming optical signal having a negative transient.

FIGS. 2A and 2B are exemplary eye diagram time charts 60A and 60B showing positive and negative amplitude transients, respectively, for the modulated optical signal 34 and the responsive modulated electrical signal 36. The drawing is scaled so that the signals 34 and 36 are shown with the same levels. In order to make the drawing easier to understand, the level 1 transients are shown in a compressed time scale as compared to the eye pattern modulation, that is, the transients are shown to occur with a faster rise and fall time (compared to the modulation) than is typical.

The eye chart 60A shows a level 1 and a level 0. The level 1 has a first signal level 62 followed by a positive transient 63 having a higher signal level and settling at a second signal level 64. The second level 64 may be greater, lesser, or the same as the first level 62. A fixed decision threshold level 72 is shown at the mid level between the level 1 and the level 1 for the first signal level 62. It can be seen by inspection that the fixed decision threshold level 72 is not at the mid level for the transient signal level 63 or the second signal level 64. The transient threshold compensator 16 applies a scale factor to the averaged electrical signal 37 for providing a dynamic transient feedforward adjustment 40 that results in the decision threshold signal 42 shown as a level 74.

The eye chart 60B also shows the level 1 and the level 0. The level 1 has the first signal level 62 followed by a negative transient 66 having a lower signal level and settling at a third signal level 67. The third level 67 may be greater, lesser, or the same as the first level 62. The fixed decision threshold level 72 is shown at the mid level between the level 0 and the level 1 for the first signal level 62. It can be seen by inspection that the fixed decision threshold level 72 is not at the mid level for the transient signal levels 66 or the third signal level 67. The transient threshold compensator 16 applies a scale factor to the averaged electrical signal 37 for providing a dynamic transient feedforward adjustment 40 that results in the decision threshold signal 42 shown as a level 76.

For the exemplary cases 60A and 60B, the optimum decision threshold level is shown as the mid level between the level 1 and the level 0. However, the scale factor that is applied by the transient threshold compensator 16 may be selected so that the levels 74 and 76 are higher or lower than the mid level.

Without the transient feedforward adjustment 40 of the present invention, the BER feedback threshold adjustment 52 would eventually drive the decision threshold signal 42 (FIG. 1) to an optimum level for minimizing errors. However, the BER feedback transient adjustment 52 necessarily requires errors to be detected over some period of time before the BER feedback threshold adjustment 52 can adjust the level of the decision threshold signal 42. The transient feedforward adjustment 40 of the present invention can act more quickly than the BER feedback threshold adjustment 52 in order to reduce the number of bit errors that occur before the BER feedback threshold adjustment 52 has time to adjust.

For a multi-level incoming optical signal 34 (two or more on-condition states and one zero state), the level 1 in the eye diagrams and the corresponding levels 62-76 are multi-level (corresponding in level to the two or more on-condition states). For example, for the optical signal 34 having three state modulation (two on-conditions states and one zero state), the level 1 and each of the corresponding levels 62-76 have two levels (corresponding to the two on-condition states); for five state modulation (four on-conditions states and one zero state), the level 1 and each of the corresponding levels 62-76 have four levels (corresponding to the four on-condition states); and so on.

Figure 3:
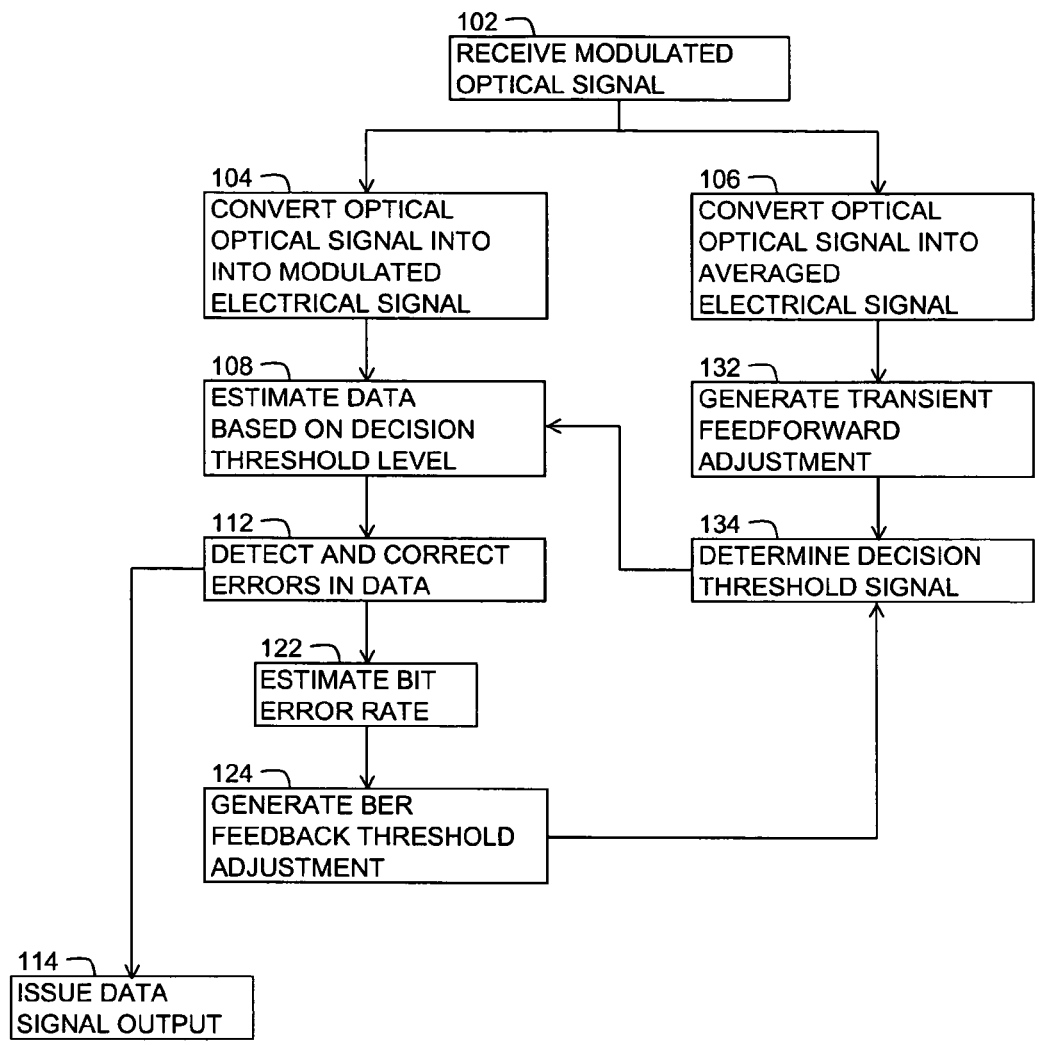
FIG. 3 is flow chart of a method of the present invention.

FIG. 3 is a flow chart of a method of the present invention for minimizing bit errors in the presence of transients and variations in a modulated optical signal. In a step 102 an amplitude or intensity modulated optical signal is received from an optical link. In steps 104 and 106 the optical signal is converted into a modulated electrical signal and an averaged electrical signal. The modulation on the electrical signal tracks the modulation on the optical signal. The level of the averaged electrical signal tracks the average level of an on-condition of the modulated optical signal. In a step 108 data is estimated for the modulated electrical signal by comparison to a level of a decision threshold signal.

At least some of the errors on the estimated data are detected and corrected in a step 112. In a step 114 the corrected estimated data is issued as an output data signal. A bit error rate is estimated in a step 122. In a step 124 the bit error rate is used for generating a BER feedback threshold adjustment.

A transient feedforward adjustment is generated in a step 132 from the averaged electrical signal. In a step 134 the decision threshold signal is determined from the transient feedforward adjustment and the BER feedback threshold adjustment. The decision threshold signal is used in the step 108 for estimating data.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An optical receiver, comprising:
   an optical to electrical converter configured to convert an incoming optical signal having optical modulation to a modulated electrical signal having electrical modulation responsive to said optical modulation and an averaged electrical signal having an electrical level responsive to an average level of said optical signal;
   a transient threshold compensator configured to receive said averaged electrical signal and issue a transient feedforward adjustment; and
   a clock data recovery system including a clock recovery circuit configured to use a decision threshold signal based on said transient feedforward adjustment to recover a clock from said modulated electrical signal; and a data estimator configured to use said clock and said decision threshold signal to estimate data from said modulated electrical signal.

2. The receiver of claim 1, further comprising:
   a BER-based threshold controller configured to use a representation of bit error rate of said modulated electrical signal to provide a BER feedback threshold adjustment; and
   a threshold combiner to combine said BER feedback threshold adjustment and said transient feedforward adjustment for providing said decision threshold signal.

3. The receiver of claim 2, wherein:
   said transient feedforward adjustment has a response time faster than said BER feedback threshold adjustment.

4. A method for receiving an optical signal, comprising:
   converting an incoming optical signal having optical modulation to a modulated electrical signal having electrical modulation responsive to said optical modulation and an averaged electrical signal having an electrical level responsive to an average level of said optical signal;
   generating a transient feedforward adjustment based upon said averaged electrical signal;
   using a decision threshold signal based on said transient feedforward adjustment for recovering a clock from said modulated electrical signal; and
   estimating data from said modulated electrical signal using said clock and said decision threshold signal.

5. The method of claim 4, further comprising:
   generating a BER feedback threshold adjustment based on a representation of bit error rate of said modulated electrical signal for providing a BER feedback threshold adjustment; and
   combining said BER feedback threshold adjustment and said transient feedforward adjustment for providing said decision threshold signal.

6. The method of claim 5, wherein:
   said transient feedforward adjustment has a response time faster than said BER feedback threshold adjustment.

7. The receiver of claim 3, wherein:
   said response time for said transient feedforward adjustment is at least ten times faster than said BER feedback threshold adjustment.

8. The method of claim 6, wherein:
   said response time for said transient feedforward adjustment is at least ten times faster than said BER feedback threshold adjustment.

* * * * *